(12) United States Patent
Hattori et al.

(10) Patent No.: US 7,015,706 B2
(45) Date of Patent: Mar. 21, 2006

(54) SEMICONDUCTOR SENSING DEVICE USING DIFFERENT RESISTANCE TYPES

(75) Inventors: Seiji Hattori, Kariya (JP); Noboru Endo, Okazaki (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 10/778,177

(22) Filed: Feb. 17, 2004

(65) Prior Publication Data

US 2004/0164753 A1    Aug. 26, 2004

(30) Foreign Application Priority Data

Feb. 26, 2003    (JP)    ............... 2003-048963

(51) Int. Cl.
  *G01R 17/00*    (2006.01)
  *G01L 19/04*    (2006.01)

(52) U.S. Cl. ............... 324/725; 324/721; 73/708

(58) Field of Classification Search ............... 324/725, 324/610, 706, 721, 727; 73/721, 727, 708
See application file for complete search history.

(56) References Cited

U.S. PATENT DOCUMENTS

| | | | | |
|---|---|---|---|---|
| 3,046,782 A | * | 7/1962 | Laimins | ............ 73/862.623 |
| 5,461,322 A | * | 10/1995 | Bey et al. | ............ 324/706 |
| 6,006,607 A | * | 12/1999 | Bryzek et al. | ............ 73/727 |
| 6,329,825 B1 | * | 12/2001 | Tanaka et al. | ............ 324/725 |
| 6,559,661 B1 | * | 5/2003 | Muchow et al. | ............ 324/725 |

FOREIGN PATENT DOCUMENTS

| | | |
|---|---|---|
| JP | B2-59-41134 | 10/1984 |
| JP | A-59-214268 | 12/1984 |
| JP | A-10-281912 | 10/1998 |
| JP | A-11-153503 | 6/1999 |

\* cited by examiner

*Primary Examiner*—Anjan Deb
(74) *Attorney, Agent, or Firm*—Posz Law Group, PLC (57) ABSTRACT

A semiconductor sensing device has a semiconductor substrate with a pressure sensing bridge circuit including piezoresistance elements formed on the substrate. Further, the semiconductor sensing device has a temperature sensing bridge circuit including resistance elements formed on the semiconductor substrate. A pair of the resistance elements is connected with a power supply terminal, and the other pair of the resistance elements is connected with a grounding terminal. The resistance elements in either or both of these pairs are formed of different resistance types from each other and of the same conductivity type.

12 Claims, 5 Drawing Sheets

SEMICONDUCTOR SENSING DEVICE USING DIFFERENT RESISTANCE TYPES

CROSS REFERENCE TO RELATED APPLICATION

This application is based on and incorporates herein by reference Japanese Patent Application No. 2003-48963 filed on Feb. 26, 2003.

FIELD OF THE INVENTION

The present invention relates to a semiconductor sensing device manufactured by forming on a semiconductor substrate a temperature sensing bridge circuit comprising resistance elements.

BACKGROUND OF THE INVENTION

A semiconductor sensing device such as a pressure sensing device has a semiconductor substrate with a pressure sensing bridge circuit comprising piezo-resistance elements formed on one side thereof. Further, a temperature sensing bridge circuit comprising resistance elements is also formed on the semiconductor substrate (JP-A-11-153503 and JP-A-10-281912).

Figure 7:
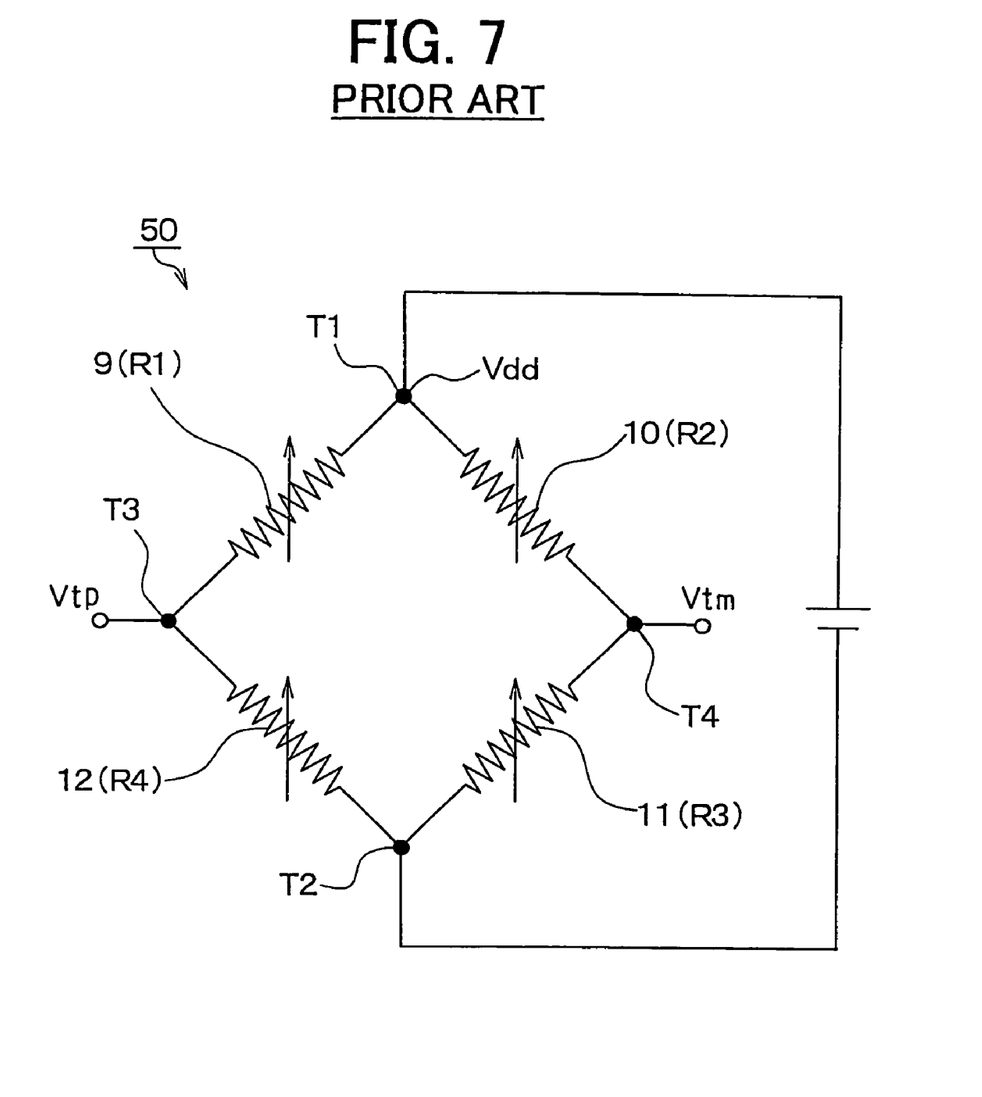
FIG. 7 is a schematic diagram of a temperature sensing bridge circuit according to a prior art.

A typical temperature sensing bridge circuit is shown in FIG. 7. As illustrated in FIG. 7, temperature sensing bridge circuits are generally manufactured by forming four resistance elements 9 to 12 having resistance values of R1 to R4 in a Wheatstone bridge.

More specifically, a power supply terminal T1 is connected with resistance elements 9 and 10, and a grounding terminal T2 is connected with resistance elements 11 and 12. At the same time, the resistance elements 9 and 12 are connected with each other at the junction T3, and the resistance elements 10 and 11 are connected with each other at the junction T4. The principle on which temperature is sensed by such a circuit is as follows.

It is assumed that the potentials at the junctions T3 and T4 in this bridge circuit are Vtp and Vtm, respectively. If Vtp=Vtm, the relation between the resistance values is expressed as R1×R3=R2×R4. This expression will be hereafter referred to as Ex. 1.

Conventionally, in general, the resistance elements 9 and 11 use an identical resistance type, and the resistance elements R2 and R4 use another identical resistance type B. The two resistance types A and B have different temperature characteristics from each other. That is, difference in resistance type means that one resistance type and the other resistance type are different in variation in resistance with temperature.

It is assumed that equilibrium, that is, Vtp=Vtm is obtained, for example, at room temperature (e.g., 25° C.). If the temperature further rises, the relation expressed by Ex. 1 does not hold, and becomes Vtp≠Vtm. As a result, a potential difference Ve is produced between junctions T3 and T4. Temperature can be sensed by variation in the potential difference Ve with temperature.

In case of a pressure sensing device, pressure information outputted from a pressure sensing circuit is corrected with the sensed temperature information. Thereby, temperature-compensated output values are produced.

However, in this temperature sensing bridge circuit, a potential difference Ve between the junctions is also produced by stress. Therefore, to enhance the temperature sensing accuracy, this potential difference Ve due to stress must be compensated for.

In the conventional pressure sensing device, the temperature sensing bridge circuit is formed on the semiconductor substrate in the position where the stress sensitivity is most impaired. Nevertheless, some stress is inevitably applied to the temperature sensing bridge circuit.

As a result, the application of stress varies the resistance values of the resistance elements for temperature sensing. Then, the potential difference Ve between junctions is varied even if the temperature does not actually change.

For this reason, when stress is applied, the potential difference Ve is caused even when no temperature change occurs. As a result, it is difficult to accurately compensate for temperature variations in output values.

SUMMARY OF THE INVENTION

It is an object of the present invention to suppress variation in potential difference due to the application of stress in the temperature sensing bridge circuit of a semiconductor sensing device such as a pressure sensing device.

To attain the above object, the present invention is constructed with a pair of resistance elements connected with a power supply terminal and another pair of resistance elements connected with a grounding terminal. The resistance elements of either or both of these resistance element pairs are composed of different resistance types from each other and are of the same conductivity type.

Since the resistance elements of either or both of these resistance element pairs are composed of different resistance types from each other, a potential difference due to temperature change can be sensed because of the characteristics of bridge circuits. Moreover, since the resistance elements of either or both of the resistance element pairs are of the same conductivity type, in that pair of resistance elements, the directions in which the resistance value is varied with stress can be made identical.

It is assumed in FIG. 7 that in the temperature sensing bridge circuit, a pair of the resistance elements connected with the power supply terminal T1 are resistance elements 9 and 10. Further, it is assumed that a pair of the resistance elements connected with the grounding terminal T2 are resistance elements 11 and 12. Moreover, it is assumed that the resistance element pair 9 and 10 on the power supply terminal side is composed of different resistance types from each other and is of the same conductivity type.

In this case, temperature is sensed based on the relation expressed by Ex 1: R1×R3=R2×R4. More specifically, the resistance elements 9 and 10 are composed of different resistance types. Therefore, when the temperature changes, a potential difference is produced between junctions in the bridge circuit. As a result, the temperature can be sensed.

Further, the resistance element pair 9 and 10 on the power supply terminal side is of the same conductivity type. Therefore, when stress is applied, for example, the resistance values of the resistance element pair 9 and 10 on the power supply terminal side are varied in the increasing direction. For this reason, even if stress is applied to the temperature sensing bridge circuit, both the left term and the right term of Ex. 1 are increased as a whole. Therefore, though the left term and the right term are not necessarily completely equalized, equilibrium can be maintained as much as possible.

That is, in this case, stress applied to the resistance element pair 9 and 10 on the power supply terminal side is significantly canceled. The same can be the case for the resistance element pair 11 and 12 connected with the grounding terminal.

Thus, the following can be done in the pressure sensing device manufactured by forming the pressure sensing bridge circuit and the temperature sensing bridge circuit on the semiconductor substrate: variation in potential difference due to the application of stress to the temperature sensing bridge circuit can be suppressed as much as possible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with respect to a pressure sensing device as a semiconductor sensing device. In reference to FIGS. 1A and 1B, the pressure sensing device has a semiconductor substrate 1 made of a silicon substrate. The semiconductor substrate 1 uses a p-type silicon substrate 1a whose surface forms the (110) plane with an n-type epitaxial layer 1b grown thereon.

Figure 1A:
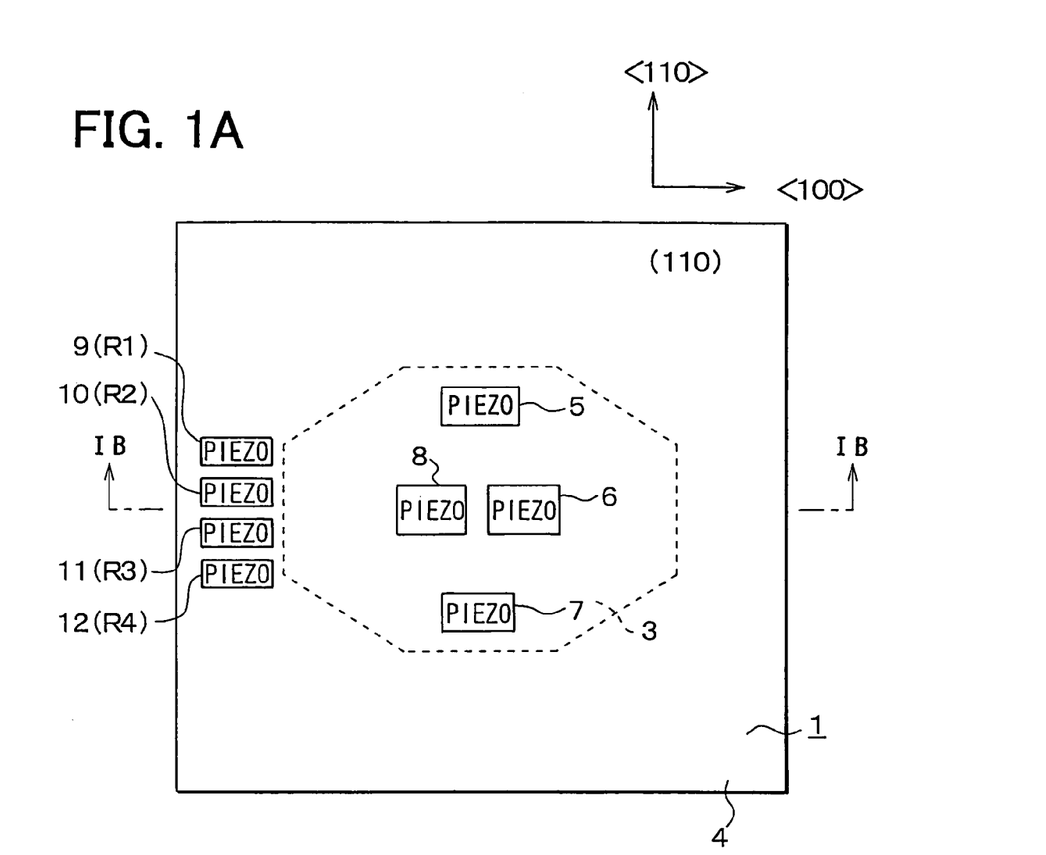
FIGS. 1A and 1B are a schematic plan view and a schematic cross-sectional view illustrating a semiconductor substrate of a semiconductor sensing device in an embodiment of the present invention.
Figure 1B:
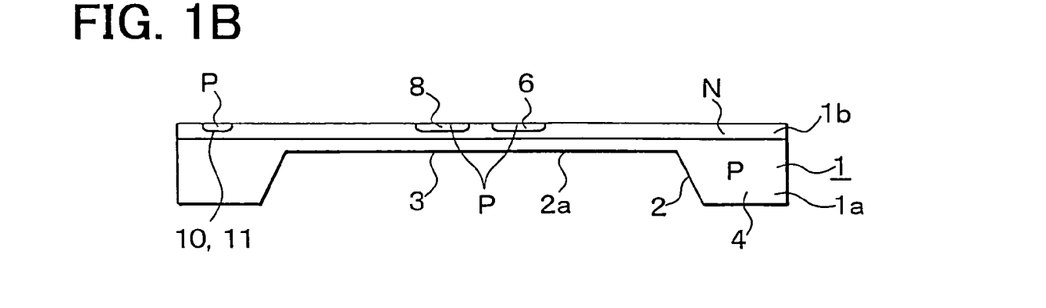

A recessed portion 2 is formed in the center of the p-type silicon substrate 1a. The bottom face portion 2a of the recessed portion 2 is a part of a thin-walled portion 3, and the rectangular frame portion therearound forms a thick-walled portion 4. More specifically, the recessed portion 2 is formed by etching a predetermined area on the p-type silicon substrate 1a by electrochemical stop etching, and stopping the etching by a p-n junction.

The thin-walled portion 3 of the semiconductor substrate 1 forms a sensor diaphragm. When pressure is applied to the diaphragm comprising the thin-walled portion 3, distortion is produced therein. Thus, the thin-walled portion 3 is formed in a part of the thick semiconductor substrate 1.

In the surface portion of, that is, on one side of the thin-walled portion 3 of the semiconductor substrate 1, piezo-resistance elements (gauge resistors) 5, 6, 7 and 8 comprising a p-type impurity diffusion layer are formed. Pressure can be measured by the output of the pressure sensing bridge circuit comprising the piezo-resistance elements 5 to 8.

In the surface portion of the thick-walled portion 4 of the semiconductor substrate 1, piezo-resistance elements 9, 10, 11 and 12 for temperature sensing composed of a p-type impurity diffusion layer are formed. Temperature can be measured by the output of the temperature sensing bridge circuit comprising the resistance elements 9 to 12. The piezo-resistance elements 9 to 12 for temperature sensing are extended in the (100) direction where the sensitivity to stress is most impaired.

Figure 2:
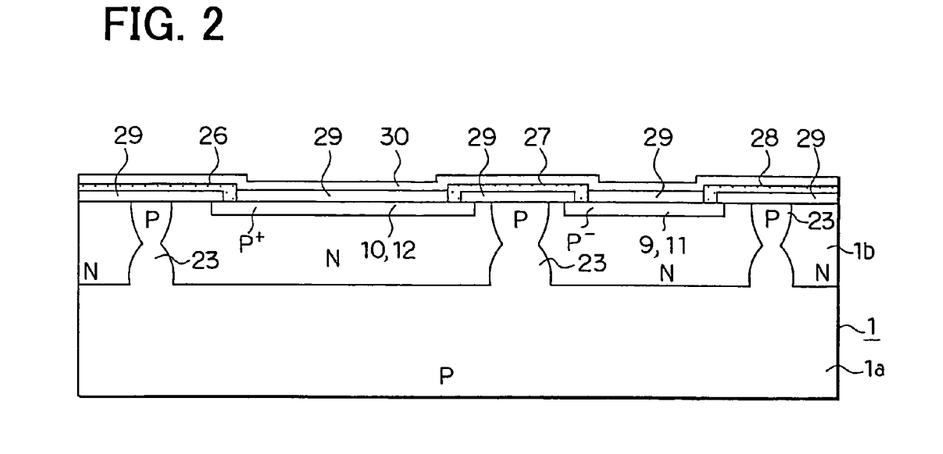
FIG. 2 is a schematic cross-sectional view illustrating the disposition of piezo-resistance elements for temperature sensing on the semiconductor substrate.

FIG. 2 is a schematic cross-sectional view illustrating the disposition of the piezo-resistance elements 9 to 12 for temperature sensing on the semiconductor substrate 1. In FIG. 2, with respect to the n-type epitaxial layer 1b, element isolation is carried out by a p-type diffusion layer 23 for element isolation.

In one island, piezo-resistance elements (diffused resistance elements) 10 and 12 composed of a heavily-doped (high density) p-type impurity diffusion layer are formed in the surface portion of the n-type epitaxial layer 1b. In another island, piezo-resistance elements (diffused resistance elements) 9 and 11 composed of a lightly-doped (low density) p-type impurity diffusion layer are formed in the surface portion of the n-type epitaxial layer 1b. Thus, the piezo-resistance elements 9 to 12 for temperature sensing are formed of different resistance types: the piezo-resistance elements 9 and 11 are composed of the lightly-doped p-type impurity diffusion layer and the piezo-resistance elements 10 and 12 are composed of the heavily-doped p-type impurity diffusion layer.

Figure 3:
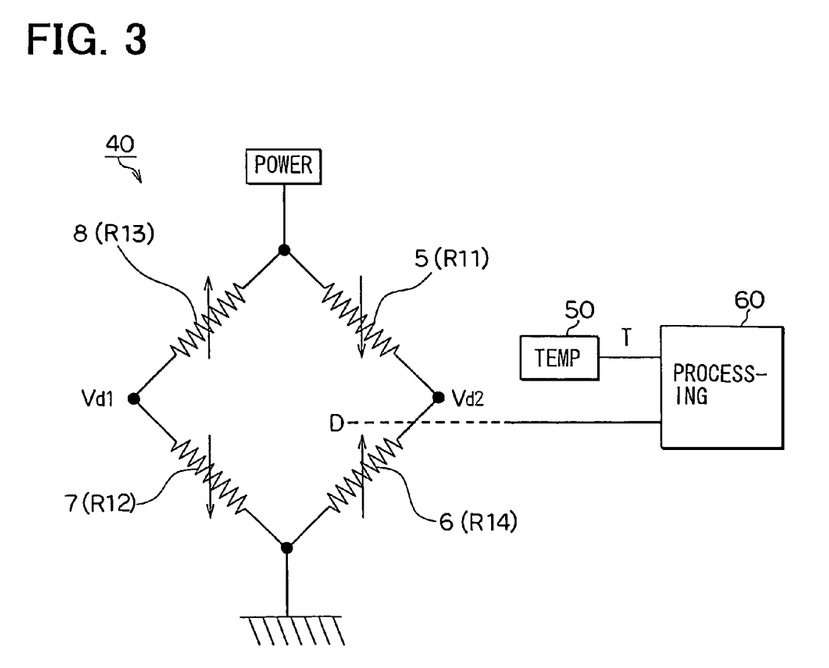
FIG. 3 is a schematic diagram of a pressure sensing bridge circuit formed on the semiconductor substrate.

The piezo-resistance elements 9 to 12 for temperature sensing are electrically connected through aluminum traces 26, 27 and 28, and constitute a temperature sensing bridge circuit 40 shown in FIG. 3. The upper face of the n-type epitaxial layer 1b is covered with a silicon oxide film 29, and the aluminum traces 26 to 28 are placed thereon. Further, the aluminum traces 26 to 28 are covered with a protective film 30.

Next, the pressure sensing bridge circuit 40 in the pressure sensing device is shown in FIG. 3, and a temperature sensing bridge circuit 50 is shown in FIG. 7.

The pressure sensing bridge circuit 40 illustrated in FIG. 3 comprises the piezo-resistance elements 5 to 8 in FIG. 1A. That is, the pressure sensing bridge circuit 40 is so constituted that it has pressure sensitive resistance elements 5, 6, 7 and 8 having respective resistance values R11, R12, R13 and R14 which are variable in correspondence with applied pressure to be sensed by piezo-resistance effect.

For this reason, the junction potential Vd1 between the resistance elements 7 and 8 is lowered with increase in the amount of applied pressure. The junction potential Vd2 between the resistance elements R11 and R14 is increased with increase in the amount of applied pressure. Then, the potential difference (Vd2−Vd1) between these junction potentials is taken out as the bridge output of the bridge circuit 40.

That is, the bridge output of the pressure sensing bridge circuit 40 serves as pressure information D. The output voltage D of the bridge circuit 40 depends on the temperature of the pressure sensing device itself as well as the applied pressure.

The temperature sensing bridge circuit 50 illustrated in FIG. 7 is in bridge connection using the piezo-resistance elements 9 to 12 in FIG. 1A. That is, as illustrated in FIG. 7, the bridge circuit 50 is composed of temperature sensitive resistance elements 9, 10, 11 and 12 whose resistance values are variable according to the temperature of the sensing device itself. More specifically, the four piezo-resistance elements 9, 10, 11 and 12 for temperature sensing constitute a Wheatstone bridge.

The power supply terminal T1 is connected with the resistance element 9 and with the resistance element 10. The grounding terminal T2 is connected with the resistance element 11 and with the resistance element 12. The resistance element 9 and the resistance element 12 are connected with each other at the junction T3. The resistance element 10 and the resistance element 11 are connected with each other at the junction T4.

Because of the foregoing, with respect to resistance type and conductivity type, the relation between the piezo-resistance elements 9 to 12 for temperature sensing in this embodiment can be described as follows.

In the temperature sensing bridge circuit 50, a pair of the resistance element 9 and the resistance element 10 is connected with the power supply terminal T1. One resistance element 9 is composed of the lightly-doped p-type impurity diffusion layer, and the other resistance element 10 is composed of the heavily-doped p-type impurity diffusion layer.

In this bridge circuit 50, a pair of the resistance element 11 and the resistance element 12 is connected with the grounding terminal T2. One resistance element 11 is composed of the lightly-doped p-type impurity diffusion layer, and the other resistance element 12 is composed of the heavily-doped p-type impurity diffusion layer.

In the temperature sensing bridge circuit 50 in this embodiment, the resistance element pair 9 and 10 is connected with the power supply terminal T1, and the resistance element pair 11 and 12 is connected with the grounding terminal T2. With respect to each pair, the resistance elements in that pair are formed of different resistance types from each other. All the resistance elements 9 to 12 are of the same conductivity type.

In the temperature sensing bridge circuit 50, voltage Vdd from a power source is applied to between the resistance element 9 and the resistance element 10. The output voltage Vtm is produced between the resistance element 10 and the resistance element 11, and the output voltage Vtp is produced between the resistance element 9 and the resistance element 12. Thus, the potential difference between these output voltages Vtm and Vtp is used to as a signal corresponding to temperature. Thus, the temperature can be measured by this bridge output signal level.

The potential difference corresponding to the temperature of the sensing device itself is produced between junction potentials Vtp and Vtm. The junction potential Vtp is that between the resistance element 9 and the resistance element 12 in FIG. 7, and the junction potential Vtm is that between the resistance element 10 and the resistance element 11. This potential difference is taken out as the bridge output of the bridge circuit 50. That is, the bridge output of the temperature sensing bridge circuit 50 in FIG. 7 serves as temperature information T.

The piezo-resistance elements 5, 6, 7 and 8 of the pressure sensing bridge circuit 40 in FIGS. 1A, 1B and 3 change their resistance values according to pressure change. The piezo-resistance elements 5, 6, 7 and 8 change their resistance values according to temperature change. In the temperature sensing bridge circuit 50, meanwhile, temperature change can be sensed by the resistance elements 9, 10, 11 and 12.

That is, the pressure sensing device is so constituted that: pressure information D outputted from the pressure sensing bridge circuit 40 and temperature information T outputted from the temperature sensing bridge circuit 50 are taken into an electronic signal processing circuit 60 as shown in FIG. 3. The pressure information D is corrected with the temperature information T in the signal processing circuit 60. Thereby, output values arising only from stress without the influences of temperature can be produced. The details of this signal processing may be the same as described in JP-A-10-281912.

The semiconductor substrate 1 can be manufactured by publicly known semiconductor manufacturing technologies, such as impurity doping and diffusion, deposition techniques, and patterning techniques.

With respect to the pressure sensing device, the temperature sensing bridge circuit 50 is formed on the semiconductor substrate 1 in a position where the stress sensitivity is most impaired. However, some stress is inevitably applied to the temperature sensing bridge circuit 50.

To cope with this, this embodiment takes measures to suppress as much as possible variation in potential difference due to the application of pressure in the temperature sensing bridge circuit. Specifically, in the bridge circuit 50, a pair of the resistance elements 9 and 10 is connected with the power supply terminal T1, and a pair of the resistance elements 11 and 12 is connected with the grounding terminal T2. With respect to each pair, the resistance elements are formed of different resistance types from each other. At the same time, the four resistance elements 9 to 12 are of the same conductivity type.

Thus, the resistance element 9 and the resistance element 10 connected with the power supply terminal T1 is formed of different resistance types from each other. Further, the resistance element 11 and the resistance element 12 connected with the grounding terminal T2 are formed of different resistance types from each other.

For this reason, potential differences due to temperature change can be sensed utilizing the characteristics of the bridge circuit 50 based on the relation expressed by Ex. 1: $R1 \times R3 = R2 \times R4$. More specifically, the resistance elements 9 and 10 are formed of different resistance types, and the resistance elements 11 and 12 are formed of different resistance types. Therefore, when temperature changes, a potential difference is produced between junctions T3 and T4 in the bridge circuit 50. As a result, the temperature can be sensed.

Further, the resistance element 9 and the resistance element 10 connected with the power supply terminal T1 and the resistance element 11 and the resistance element 12 connected with the grounding terminal T2 are of the same conductivity type in terms of the respective relation therebetween.

In this case, in the relation expressed by Ex. 1: $R1 \times R3 = R2 \times R4$, when stress is applied, for example, the resistance values of all the resistance elements R1 to R4 are varied in the increasing direction. For this reason, even if stress is applied to the temperature sensing bridge circuit, both the left term and the right term of Ex. 1 are increased as a whole. Therefore, though left term and the right term are not necessarily completely equalized, equilibrium can be maintained as much as possible.

In this embodiment, the following can be done in the pressure sensing device manufactured by forming the pressure sensing bridge circuit 40 and the temperature sensing bridge circuit 50 on the semiconductor substrate 1: variation in potential difference due to the application of stress to the temperature sensing bridge circuit 50 can be suppressed as much as possible.

In this embodiment, in each of the resistance element pairs connected with the terminals T1 and T2, one resistance element and the other are formed of different resistance types from each other. Further, all the resistance elements 9 to 12 are of the same conductivity type. This construction is on the precondition that when the temperature sensing bridge circuit 50 is constituted, temperature can be sensed.

Temperature cannot be sensed because of the relation expressed by Ex. 1 (R1×R3=R2×R4), for example, in the following case: with respect to the bridge circuit 50, on the power supply terminal T1 side, the resistance element 9 is composed of a lightly-doped p-type impurity diffusion layer and the resistance element 10 is composed of a heavily-doped p-type impurity diffusion layer; and on the grounding terminal T2 side, the resistance element 11 (resistance element 11) is composed of a heavily-doped p-type impurity diffusion layer and the resistance element 12 (resistance element 12) is composed of a lightly-doped p-type impurity diffusion layer. It is evident that such cases should be excluded from the present invention.

In this embodiment, another construction may be adopted. For instance, only a pair of the resistance element 9 and the resistance element 10 connected with the power supply terminal T1 in the temperature sensing bridge circuit 50 may be formed of different resistance types from each other. Only the resistance element pair 9 and 10 may be of the same conductivity type.

Alternatively, only a pair of the resistance element 11 and the resistance element 12 connected with the grounding terminal T2 in the temperature sensing bridge circuit 50 may be formed of different resistance types from each other. Only the resistance element pair 11 and 12 may be of the same conductivity type.

In these cases as well, either or both of the resistance element pairs in the temperature sensing bridge circuit 50 are formed of different resistance types from each other. One pair 9 and 10 is connected with the power supply terminal T1 and the other pair 11 and 12 is connected with the grounding terminal T2. Therefore, potential differences due to temperature change can be sensed because of the characteristics of the bridge circuit 50.

Further, the resistance elements in either or both of the resistance element pairs are of the same conductivity type. Therefore, with respect to that pair of resistance elements, the directions in which the resistance value is varied with stress can be made identical.

For example, a pair of the resistance element 9 and the resistance element 10 connected with the power supply terminal T1 in the temperature sensing bridge circuit 50 is formed of different resistance types from each other. The resistance elements 9 and 10 are provided with the same conductivity type.

Such examples include various cases. One is a case where in the bridge circuit 50, the resistance element 9 is composed of a lightly-doped p-type impurity diffusion layer; and the others (resistance element 10, resistance element 11, and resistance element 12) are composed of a heavily-doped p-type impurity diffusion layer. Another example is a case where the resistance element 9, resistance element 11, and resistance element 12 are composed of a lightly-doped p-type impurity diffusion layer; and the other resistance element 10 is composed of a heavily-doped p-type impurity diffusion layer.

In these cases as well, the resistance elements 9 and 10 are formed of different resistance types. Therefore, when temperature changes, a potential difference is produced between junctions T3 and T4 in the bridge circuit 50 because of the relation expressed by Ex. 1: R1×R3=R2×R4. As a result, the temperature can be sensed.

Further, a pair of the resistance elements 9 and 10 on the power supply terminal T1 side is of the same conductivity type. Therefore, when pressure is applied, for example, the resistance values of the resistance element pair 9 and 10 on the power supply terminal T1 is varied in the increasing direction. For this reason, even if stress is applied to the temperature sensing bridge circuit 50, both the left term and the right term of Ex. 1 are increased as a whole. Therefore, similarly with the above, equilibrium can be maintained as much as possible.

In this case, stress applied to the resistance element pair 9 and 10 on the power supply terminal T1 side is significantly canceled. The same is true for the resistance element pair 11 and 12 connected with the grounding terminal T2.

As described above, the effect of this embodiment is provided also when the resistance elements in the temperature sensing bridge circuit 50 are constructed as follows: either or both of the resistance element pair 9 and 10 connected with the power supply terminal T1 and the resistance element pair 11 and 12 connected with the grounding terminal T2 are formed of different resistance types from each other. At the same time, the resistance elements in that pair are provided with the same conductivity type.

In this embodiment, the heavily-doped p-type diffusion layer and the lightly-doped p-type diffusion layer are used as the different resistance types. However, the present invention is not limited to this construction. Any other construction, such as p-well layer and n-type diffusion layer, may be adopted as long as the relation in this embodiment is maintained with respect to resistance type and conductivity type.

Figure 4:
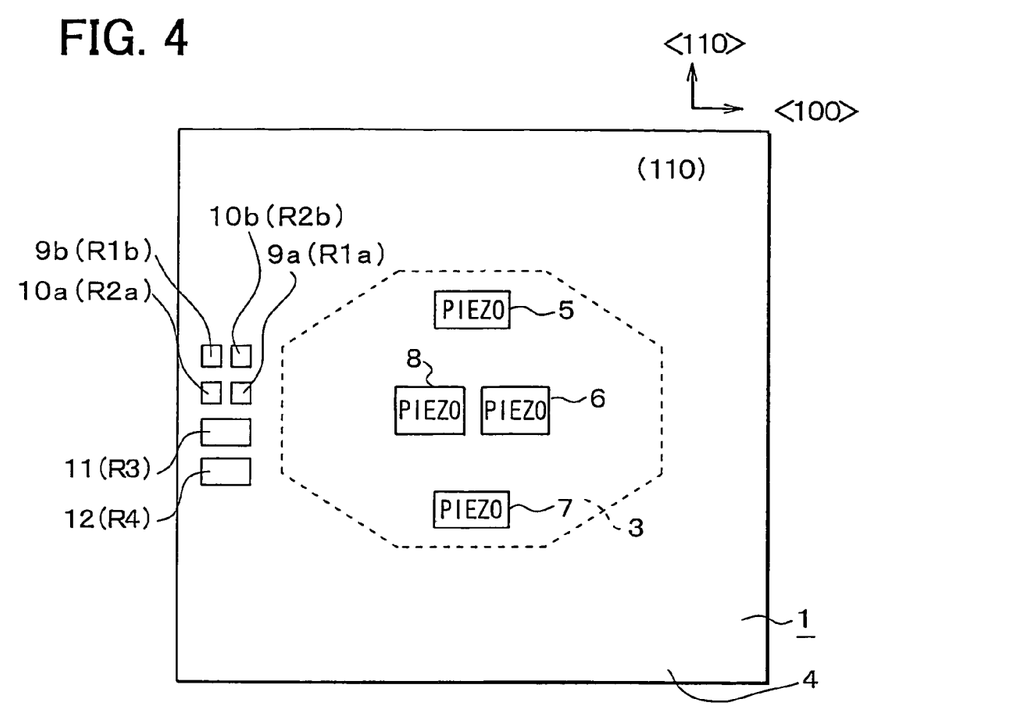
FIG. 4 is a plan view of a preferred disposition of piezo-resistance elements for temperature sensing on the semiconductor substrate which piezo-resistance elements constitute the temperature sensing bridge circuit.
Figure 5:
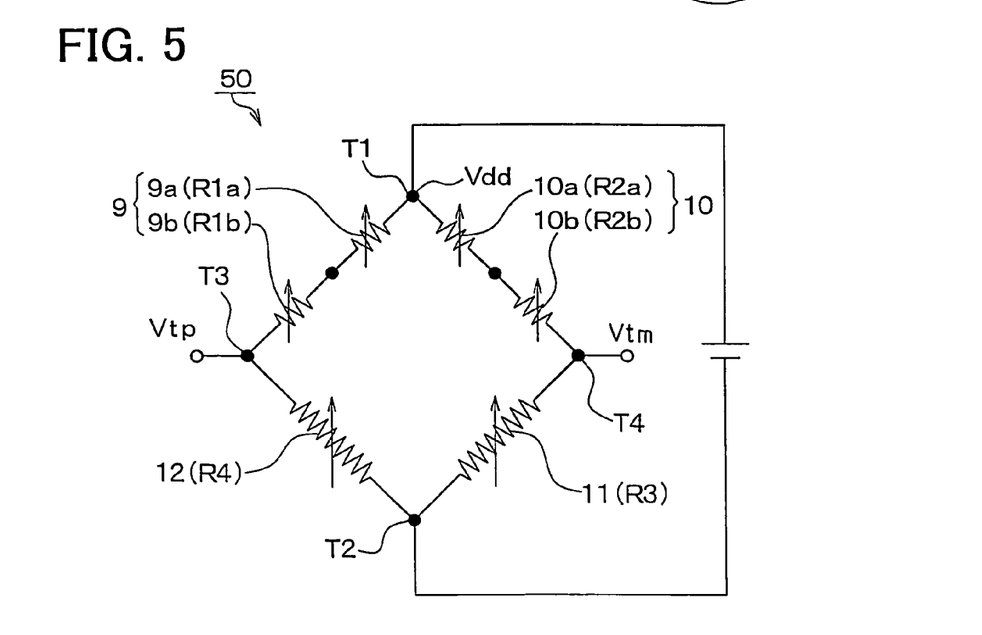
FIG. 5 is a schematic diagram of the temperature sensing bridge circuit in the embodiment illustrated in FIG. 4.

FIG. 4 is a plan view of a preferred disposition of the piezo-resistance elements 9 (9a, 9b) to 12 for temperature sensing on the semiconductor substrate 1. The piezo-resistance elements constitute the temperature sensing bridge circuit 50. FIG. 5 is a schematic diagram of the temperature sensing bridge circuit 50 in the embodiment illustrated in FIG. 4.

In the temperature sensing bridge circuit 50, a pair of the resistance element 9 and resistance element 10 connected with the power supply terminal T1 are divided into first divided resistance elements (divided resistance element 9a of resistance R1a and divided resistance element 10a of resistance R2a) and second divided resistance elements (divided resistance element 9b of resistance R1b and divided resistance element 10b of resistance R2b). The principle on which the bridge circuit 50 illustrated in FIG. 5 senses temperature is the same as that of the bridge circuit 50 illustrated in FIG. 7.

This embodiment can be implemented as follows: with respect to the resistance element 9, the lightly-doped p-type diffusion layer in FIG. 2 is divided; with respect to the resistance element 10, the heavily-doped p-type diffusion layer in FIG. 2 is divided. Similarly with the above, the divided resistance elements 9a, 9b, 10a and 10b and the other resistance elements 11 and 12 can be connected through aluminum traces.

With respect to a pair of the resistance elements 9 and 10 which are divided, as illustrated in FIG. 4, the four divided resistance elements 9a, 9b, 10a and 10b are disposed so that they will be positioned at the vertexes of a virtual rectangle.

With respect to one resistance element 9, the first divided resistance element 9a and the second divided resistance element 9b are positioned on a diagonal line. With the other resistance element 10, the first divided resistance element 10a and the second divided resistance element 10b are positioned on another diagonal line.

That is, with respect to a pair of the resistance elements 9 and 10 which are divided, the following can be understood: of the four divided resistance elements 9a, 9b, 10a and 10b, the first and second divided resistance elements 9a and 9b of the resistance element 9 and the first and second divided resistance elements 10a and 10b of the resistance element 10 are disposed in positional relation in a diagonally crossing pattern.

Figure 6A:
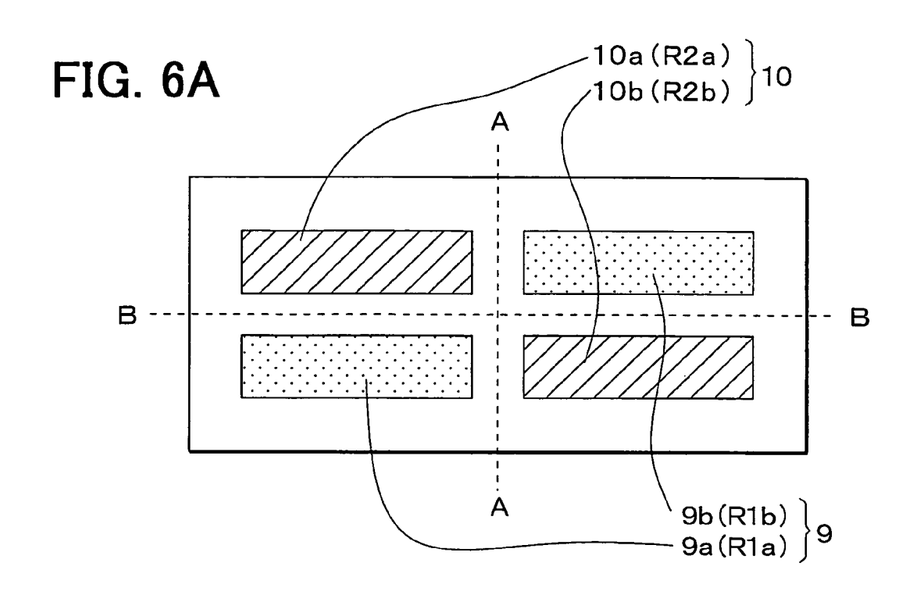
FIGS. 6A and 6B are schematic views illustrating the effect of the embodiment illustrated in FIG. 4.
Figure 6B:
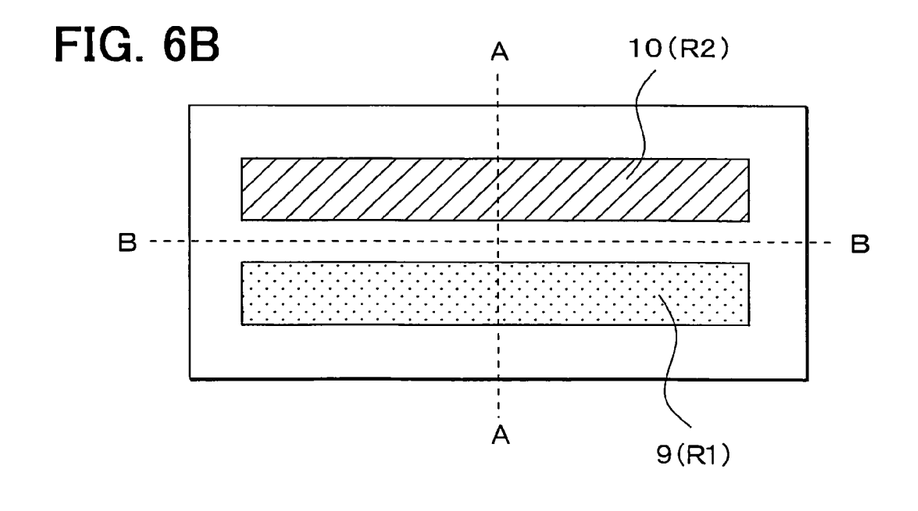

The effect of this positioning in the diagonally crossing pattern will be described referring to FIGS. 6A and 6B. FIG. 6A is a layout illustrating a case where a pair of the resistance elements 9 and 10 are divided into the divided resistance elements 9a, 9b, 10a and 10b. FIG. 5B is a layout illustrating a pair of the resistance elements 9 and 10 in FIG. 1A. FIGS. 6A and 6B are hatched for facilitating identification.

First, the layout illustrated in FIG. 6B will be described. If stress applied to the left area of the broken line A—A and that to the right area are different from each other, a significant problem does not arise. However, if stress applied to the upper area of the broken line B—B and that to the lower area are different from each other, a problem arises.

As an example, it is assumed that stress is high in the area above the broken line B—B and low in the area under the line B—B. In this case, the resistance value of the upper resistance element 10 greatly varies, but variation in that of the lower resistance element 9 is slight. That is, stress tend to be imbalanced between a pair of the resistance element 9 and the resistance element 10. As a result, variation in potential difference due to stress is likely to become significant because of Ex. 1: R1×R3=R2×R4.

Meanwhile, in case of the diagonally crossing layout illustrated in FIG. 6A, applied stress is dispersed between the resistance element 9 and the resistance element 10, and imbalance is less likely to occur. This is the case not only when stress applied to the left area of the broken line A—A and that to the right area are different from each other. It is the case also when stress applied to the upper area of the broken line B—B and that to the lower area are different from each other.

As described above, disposing the divided resistance elements 9a, 9b, 10a and 10b manufactured by dividing a pair of the resistance elements 9 and 10 in a diagonally crossing pattern produces an advantage. Applied stress is averaged between the resistance elements 9 and 10 in the pair. Thus, for example, excessively high stress is restricted from being applied to either resistance element.

This reduces differences in change in resistance value due to stress between a pair of the divided resistance elements 9 and 10. That is, to suppress variation in potential difference due to the application of stress to the temperature sensing bridge circuit 50 as much as possible, it is preferable that the diagonally crossing layout should be adopted.

In the above example, of the resistance elements 9 to 12 in the temperature sensing bridge circuit 50, the resistance element pair 9 and 10 connected with the power supply terminal T1 is divided. Then, the obtained divided resistance elements are disposed in the diagonally crossing pattern. It is however evident that if the resistance element pair 11 and 12 connected with the grounding terminal T1 are divided and disposed in a diagonally crossing pattern, the same effect will be produced.

What is claimed is:

1. A semiconductor sensing device comprising:
a semiconductor substrate; and
a temperature sensing bridge circuit including resistance elements formed on the semiconductor substrate,
wherein the resistance elements in either or both of a pair of the resistance elements connected with a power supply terminal in the temperature sensing bridge circuit and a pair of the resistance elements connected with a grounding terminal are formed of different resistance types from each other and of the same conductivity type.

2. The semiconductor sensing device according to claim 1, further comprising:
a pressure sensing bridge circuit including piezo-resistance elements formed on the substrate; and
a signal processing circuit for correcting an output of the pressure sensing bridge circuit by an output of the temperature sensing bridge circuit.

3. The semiconductor sensing device according to claim 1, wherein in each of a pair of the resistance elements connected with the power supply terminal in the temperature sensing bridge circuit and a pair of the resistance elements connected with the grounding terminal, one resistance element and the other are formed of different resistance types from each other, and the resistance elements in the temperature sensing bridge circuit are all of the same conductivity type.

4. The semiconductor sensing device according to claim 1, wherein
the resistance elements in either or both of a pair of the resistance elements connected with the power supply terminal in the temperature sensing bridge circuit and a pair of the resistance elements connected with the grounding terminal are divided into first divided resistance elements and second divided resistance elements, and
the four divided resistance elements manufactured by the division of a pair of the resistance elements are positioned at vertexes of a virtual rectangle, and the first divided resistance element and the second divided resistance element of one resistance element are positioned on a diagonal line and the first divided resistance element and the second divided resistance element of the other resistance element are positioned on another diagonal line.

5. The semiconductor sensing device according to claim 1, further comprising a pressure sensing bridge circuit including resistance elements formed on the semiconductor substrate,
wherein the resistance elements of the pressure sensing bridge circuit and the temperature sensing bridge circuit are formed of impurity diffusion layers.

6. The semiconductor sensing device according to claim 5, wherein the impurity diffusion layers have different densities of the same impurity.

7. A semiconductor sensing device comprising:
a semiconductor substrate; and
a temperature sensing bridge circuit including resistance elements formed on the semiconductor substrate,
wherein the resistance elements in either or both of a pair of the resistance elements connected with a power supply terminal in the temperature sensing bridge circuit and a pair of the resistance elements connected with a grounding terminal are divided into first divided resistance elements and second divided resistance elements, the four divided resistance elements manufactured by the division of a pair of the resistance elements are positioned at vertexes of a virtual rectangle, and further the first divided resistance element and the second divided resistance element of one resistance element are positioned on a diagonal line and the first divided resistance element and the second divided resistance element of the other resistance element are positioned on another diagonal line;

two resistance elements in at least one pair of the resistance elements being of a different resistance type and of the same conductivity type.

8. A semiconductor sensing device comprising:

a semiconductor substrate; and a temperature sensing bridge circuit including resistance elements formed on the semiconductor substrate, wherein the resistance elements in either or both of a pair of the resistance elements connected with a power supply terminal in the temperature sensing bridge circuit and a pair of the resistance elements connected with a grounding terminal are divided into first divided resistance elements and second divided resistance elements, the four divided resistance elements manufactured by the division of a pair of the resistance elements are positioned at vertexes of a virtual rectangle, and further the first divided resistance element and the second divided resistance element of one resistance element are positioned on a diagonal line and the first divided resistance element and the second divided resistance element of the other resistance element are positioned on another diagonal line;

a pressure sensing bridge circuit including piezo-resistance elements formed on the substrate at a location thinner than that of the temperature sensing bridge circuit; and a signal processing circuit for correcting an output of the pressure sensing bridge circuit by an output of the temperature sensing bridge circuit.

9. A semiconductor sensing device comprising:

a semiconductor substrate;

a pressure sensing bridge circuit including first resistance elements formed on the semiconductor substrate;

a temperature sensing bridge circuit including second resistance elements formed on the semiconductor substrate, wherein the resistance elements in each of a pair of the resistance elements connected with a power supply terminal in the temperature sensing bridge circuit and a pair of the resistance elements connected with a grounding terminal in the temperature sensing bridge circuit are formed of impurity diffusion layers having the same resistance changing direction relative to applied stress.

10. The semiconductor sensing device according to claim 9, wherein the impurity diffusion layers have different densities of the same impurity.

11. The semiconductor sensing device according to claim 9, further comprising a signal processing circuit for correcting an output of the pressure sensing bridge circuit by an output of the temperature sensing bridge circuit.

12. The semiconductor sensing device according to claim 9, wherein the resistance elements in either or both of a pair of the resistance elements connected with the power supply terminal in the temperature sensing bridge circuit and a pair of the resistance elements connected with the grounding terminal are divided into first divided resistance elements and second divided resistance elements, and the four divided resistance elements manufactured by the division of a pair of the resistance elements are positioned at vertexes of a virtual rectangle, and the first divided resistance element and the second divided resistance element of one resistance element are positioned on a diagonal line and the first divided resistance element and the second divided resistance element of the other resistance element are positioned on another diagonal line.

* * * * *